United States Patent [19]

Saliba

[11] Patent Number: 5,371,638
[45] Date of Patent: Dec. 6, 1994

[54] SERVO METHOD AND APPARATUS FOR VERY HIGH TRACK DENSITY MAGNETIC RECORDING BY ADJUSTING HEAD POSITION BASED ON SERVO INFORMATION READ FROM ADJACENT TRACK

[75] Inventor: George A. Saliba, Northboro, Mass.

[73] Assignee: Digital Equipment Corporation, Maynard, Mass.

[21] Appl. No.: 222,491

[22] Filed: Apr. 1, 1994

Related U.S. Application Data

[63] Continuation of Ser. No. 903,641, Jun. 24, 1992, abandoned.

[51] Int. Cl.⁵ ............................................. G11B 5/584
[52] U.S. Cl. ........................... 360/77.12; 360/77.01; 360/76; 360/60; 360/121
[58] Field of Search ............ 360/77.12, 60, 76, 77.01, 360/121

[56] References Cited

U.S. PATENT DOCUMENTS

| | | |
|---|---|---|
| 2,937,239 | 5/1960 | Garper et al. |
| 3,829,895 | 8/1974 | Tanaka et al. |
| 3,919,697 | 11/1975 | Walker ........................ 360/77.12 X |
| 4,149,204 | 4/1979 | Marino et al. |
| 4,321,634 | 3/1982 | Lehureau ...................... 360/70 |
| 4,334,252 | 6/1982 | Toriu . |
| 4,422,112 | 12/1983 | Tanaka ......................... 360/77.12 |
| 4,424,541 | 1/1984 | Koinuma et al. |
| 4,439,793 | 3/1984 | Nater . |
| 4,472,750 | 9/1984 | Klumpp et al. ............... 360/78.02 |
| 4,479,156 | 10/1984 | Kumagai et al. |
| 4,502,082 | 2/1985 | Ragle et al. ................... 360/76 |
| 4,539,615 | 9/1985 | Arai et al. . |
| 4,685,005 | 8/1987 | Fields, Jr. . |
| 4,802,030 | 1/1989 | Henry et al. . |
| 4,975,791 | 12/1990 | Eggebeen ..................... 360/77.01 |
| 4,979,051 | 12/1990 | Eggebeen . |
| 5,121,270 | 6/1992 | Alcudia et al. ................ 360/77.01 |
| 5,126,895 | 6/1992 | Yasuda et al. ................. 360/60 X |
| 5,132,861 | 7/1992 | Behr et al. .................... 360/77.12 X |
| 5,257,148 | 10/1993 | Solhjell et al. ................ 360/77.12 X |
| 5,285,331 | 2/1994 | White ........................... 360/77.12 |

FOREIGN PATENT DOCUMENTS

0223236A2 5/1987 European Pat. Off. .

Primary Examiner—Aristotelis Psitos
Assistant Examiner—James L. Habermehl
Attorney, Agent, or Firm—Mary M. Steubing; Ronald C. Hudgens; Albert P. Cefalo

[57] ABSTRACT

A magnetic tape recording system which achieves very high track densities through utilization of a recording method and apparatus. A magnetic head is described in which the read head gaps are parallel to but laterally offset from the write head gaps. A head assembly is further provided in which the magnetic head is mounted on a rotary motor for aligning the head for writing and reading tracks at different azimuth angles, as well as a stepping motor and linear actuator for stepping the head between tracks. Also, a servo tracking method and apparatus is presented in which writing and reading take place under servo control. This servo allows alignment of the write head gap during writing, and the read head gap during reading, through observation of low frequency servo data blocks dynamically imbedded amidst adjacent track data. The utilization of this servo minimizes tracking error due to lateral tape motion.

30 Claims, 9 Drawing Sheets

SERVO METHOD AND APPARATUS FOR VERY HIGH TRACK DENSITY MAGNETIC RECORDING BY ADJUSTING HEAD POSITION BASED ON SERVO INFORMATION READ FROM ADJACENT TRACK

This application is a continuation of application Ser. No. 07/903,641 filed Jun. 24, 1992 now abandoned.

FIELD OF THE INVENTION

This invention relates generally to magnetic storage devices and particularly to a method and apparatus for achieving very high track densities in a magnetic tape recording system.

BACKGROUND OF THE INVENTION

The constantly increasing operational speeds of digital computers are creating a demand for corresponding increases in the data storage capacities of magnetic tape recording and reproducing systems, while maintaining the special requirements of high speed digital tape systems.

Tape recording and reproducing systems for use as computer data storage devices are required to provide high data transfer rates and to perform a read check on all written data. To satisfy these requirements, conventional tape systems typically employ methods of recording known as linear recording, in which the tracks of data lie parallel to each other and to the edge of the tape, or helical scan recording, in which the tracks of data lie parallel to each other but diagonal to the edge of the tape. The linear recording method offers higher data transfer rates; however, it is desireable to obtain higher data densities while retaining the advantages of this method.

Tape track densities are limited by crosstalk, which occurs when reading is interfered with by data of adjacent tracks. Crosstalk is exacerbated by error in head gap alignments. Some methods have been implemented to minimize this effect, such as leaving guard bands between tracks, or using wider write head gaps. These methods, however, limit track densities.

A method of recording known as azimuth recording has been used in helical scan systems in order to decrease the effects of crosstalk and thus increase the track density of these systems. Azimuth recording results in a recorded track pattern in which the magnetization directions of adjacent data tracks lie at different azimuth angles to each other. This method greatly reduces intertrack crosstalk, allowing tracks to be placed closer together. The need for guard bands or wide write heads is thus reduced or eliminated. The helical scan method, however, is subject to limited data transfer rates.

U.S. Pat. No. 4,539,615 to Arai et al., Azimuthal Magnetic Recording and Reproducing Apparatus, 1985, discloses a number of heads, head assemblies, and methods which can be used to employ azimuth recording in linear tape systems. However, most of the magnetic heads contain multiple read and/or write head gaps which are not parallel to each other or to the sides of the head. Accordingly, these heads are more difficult to manufacture, and they are incapable of reading standard tapes recorded with no azimuth angle. Also, most of the magnetic heads available are not capable of performing a read check on newly written data. Those heads which are capable of performing a read check do so at the added cost of an extra column of head gaps.

Another problem which limits tape track densities is lateral tape motion, which is the random and unavoidable tendency for a tape to drift in a direction lateral to the direction of tape motion. During a tape write, lateral tape motion causes track directions to deviate from the parallel to the edge of the tape. During a read, lateral tape motion causes misregistration of the read head over the track being read. This misregistration results in read data error.

Servo tracking techniques have been developed to reduce the effects of tracking error and thus improve the data capacity of tape systems. Known servo techniques vary widely, but most involve methods of dynamically moving the read head gap to continually reposition it over the written data track. The movement of the read head gap compensates for lateral tape motion during a read. However, lateral tape motion during writing is not controlled with respect to the write head gap; thus, the distance between tracks is still limited to the magnitude of the lateral tape motion in order to avoid over-writing previously written tracks. Known servo techniques are also costly in that they may require the use of preformatted tapes or additional heads.

It is desireable to present a magnetic head with parallel head gaps which is relatively inexpensive and easy to manufacture, and which can be utilized to provide an azimuth recording pattern to decrease the effects of crosstalk, thus increasing track density, while maintaining the ability to read standard non-azimuth format tapes. It is also desireable to be able to perform a read check after write with this head. Further, it is desireable to present a low cost servo tracking mechanism which works in concert with this head to control the effects of tracking error during writing as well as during reading in order to further increase track density. It is then possible to provide a tape system suited for computer data applications in which the data capacities are greatly increased over those of the prior art.

SUMMARY OF THE INVENTION

In accordance with the principles of the present invention, a method and apparatus is presented which achieves very high track density through the interaction of a magnetic head and a servo, while satisfying the requirements of computer data applications.

In one aspect of the present invention, a magnetic head is provided which includes longitudinal read head gaps and write head gaps which are all parallel. The write head gaps are laterally spaced apart on a surface of the head. The read head gaps are located between the write head gaps, but are longitudinally offset from them. This configuration of head gaps allows read checking of newly written data with a reduced number of head gaps.

In another aspect of the present invention, a head assembly is provided in which a head like the above described head is mounted on a rotary actuator for rotatably moving the head, and on an actuator for stepping between tracks. The rotatable movement of the magnetic head allows the recording of tracks of data in which the data of adjacent tracks are at azimuth angles, thus reducing inter-track crosstalk.

In another aspect of the present invention, a method of recording multiple data tracks on a magnetic recording medium is provided. According to this method, each track contains intervals of data at a first frequency, followed by intervals of servo tracking information at a second, lower frequency.

Another aspect of the present invention is a servo which controls the position of the magnetic head during both writing and reading. This servo method relies on recording in which low frequency servo data blocks are imbedded at predetermined intervals amidst higher frequency data.

According to this servo, during writing of a track, the tape is monitored for servo information in the adjacent track. The lateral position of the write head gap of the magnetic head is adjusted based on the amplitude of the difference between alternate servo information read as compared to a reference value. In a specific sense, tracks include intervals of data interspersed with alternate intervals of even and odd servo blocks. As a track is written, writing is disabled during the presence of an odd servo block in the adjacent, previously written track. The difference in amplitude between even and odd servo information read from the adjacent track is compared to a reference differential, and the lateral position of the write head gap is adjusted based on the result of the comparison to maintain a substantially contiguous relationship between tracks.

This servo also uses the embedded even and odd blocks of servo information during reading. The read servo monitors the low frequency servo data blocks of tracks immediately adjacent to either side of the track being read. The amplitude of a servo block of one adjacent track is compared to the amplitude of a servo block later read from the other adjacent track. When these amplitudes are unequal, servo control circuitry adjusts the lateral position of reading to center the read head over the track being read.

These aspects of the invention are combined in a very high track density magnetic tape recording system in which the magnetic head is relatively easy to manufacture and which supports the computer data application requirement for read checking after write.

DETAILED DESCRIPTION OF THE PREFERRED EMBODIMENT

Figure 1:
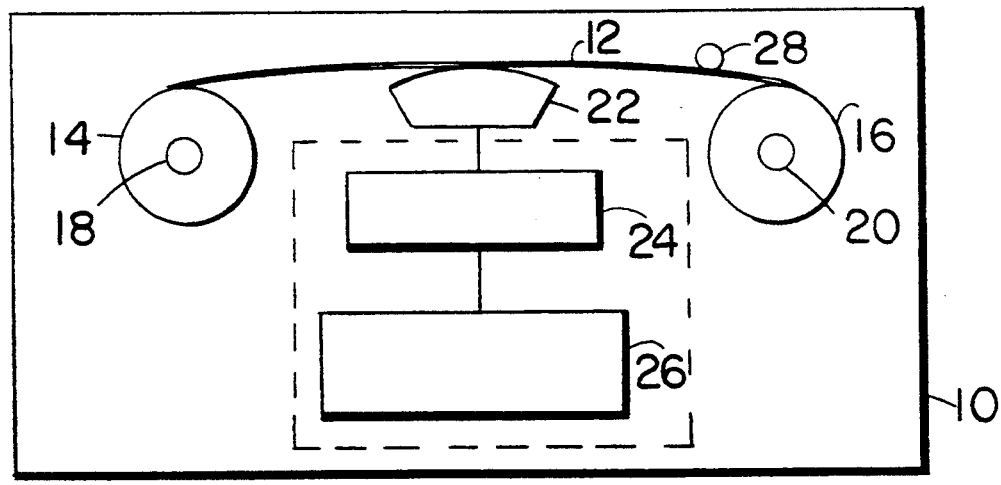
FIG. 1 is a schematic view of a magnetic tape system according to the principles of the invention.

FIG. 1 shows a magnetic tape system 10 for azimuth recording at very high track densities on a magnetic tape 12. The tape reels 14 and 16 are mounted on rotatably driven reel drive motors 18 and 20. The reel drive motors 18 and 20 rotate the reels 14 and 16 to move the tape 12 in a forward direction from the reel 14 to the takeup reel 16. As the tape 12 advances, it moves across the magnetic head 22, which writes linear tracks of data onto the tape 12. The magnetic head 22 contains separate write and read head gaps, allowing read checking of written data. When the entire length of the tape 12 has been transferred from the tape reel 14 to the reel 16, the direction of rotation of the reel drive motors 18 and 20 is reversed. The tape 12 now advances across the magnetic head 22 in the reverse direction. As the tape 12 begins to advance in the reverse direction, the magnetic head 22 is stepped in a lateral direction across the tape by the magnetic head assembly 24, enabling the recording of another track of information on the tape 12. The controller 26 provides data to be written by the magnetic head 22, accepts read data from the magnetic head 22, and provides control information to the head assembly 24. The advancement of the tape 12 continues in forward and reverse directions with the magnetic head 22 stepped laterally across the tape, resulting in multiple parallel recorded tracks. The position of the magnetic head 22 relative to the lengthwise location on the tape 12 is continuously monitored by position sensing means such as an optical tachometer 28.

Very high track densities are obtained through the interaction of a magnetic head like the magnetic head 22 of FIG. 2, which enables efficient azimuth recording, and a servo, to be described in more detail hereinafter. A typical recorded track pattern resulting from the use of the tape system 10 of FIG. 1 is shown in FIG. 3. The tracks 30 and 32 are recorded such that the direction of magnetization of the data is at a first angle relative to the lateral direction of the tape 12. The tracks 34 and 36 are recorded at a second such angle. The result is an azimuth recording in which the data of adjacent tracks lies at different azimuth angles. Servo blocks 40 are interspersed in the data of the tracks 30, 32, 34, and 36, at locations as determined by tachometer 28 of FIG. 1.

Figure 2:
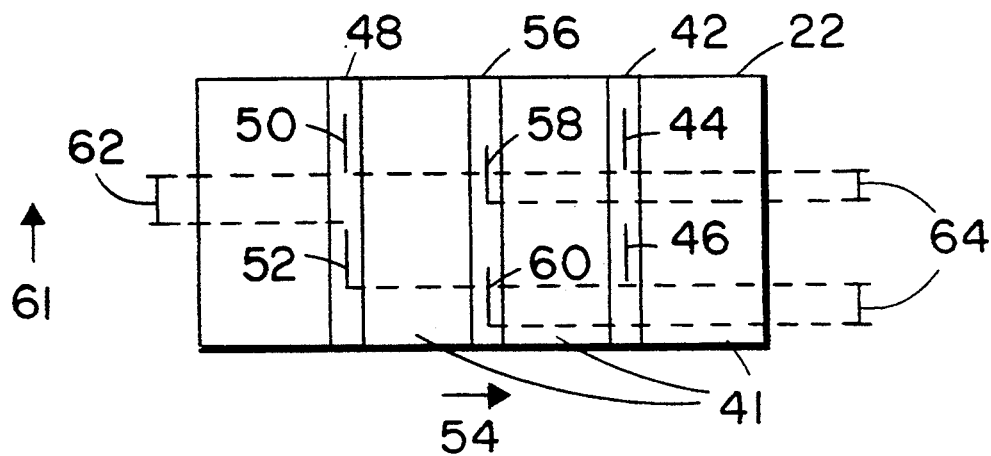
FIG. 2 is a schematic representation of a head gap arrangement of one embodiment of a magnetic head according to the principles of the invention.
Figure 3:
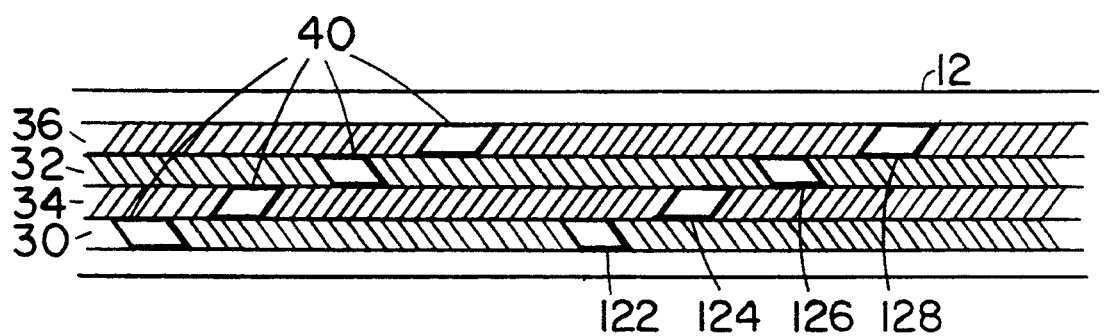
FIG. 3 is an enlarged section of recorded magnetic tape, displaying an azimuth track pattern with embedded servo blocks.

The azimuth recording shown in FIG. 3 is achieved through utilization of a magnetic head like the magnetic head 22 of FIG. 2. Referring to FIG. 2, the surface 41 of the magnetic head 22 contains a first column 42 of write head gaps 44 and 46, a second column 48 of write head gaps 50 and 52 spaced laterally from the first column as shown by the arrow 54, and a third column 56 of read head gaps 58 and 60 situated between the columns 42 and 48. The head gaps of each column are arranged such that their lengths extend in a lengthwise or longitudinal direction generally parallel to the direction of the arrow 61, as shown in FIG. 2. The write head gaps 44 and 46, the write head gaps 50 and 52, and the read head gaps 58 and 60 are arranged such that there is an end-to-end space 62 between them. Further, the corresponding head gaps in the two columns 42 and 48 are placed such that the write head gaps 50 and 44 are generally laterally aligned, and the write head gaps 52 and 46 are generally laterally aligned. The read head gaps 58 and 60 in the third column 56 are offset in a lengthwise direction and distance 64 from the corresponding write head gaps in the other two columns 42 and 48. In this arrangement, magnetic head 22 allows azimuth recording of multiple tracks at once.

Figure 4:
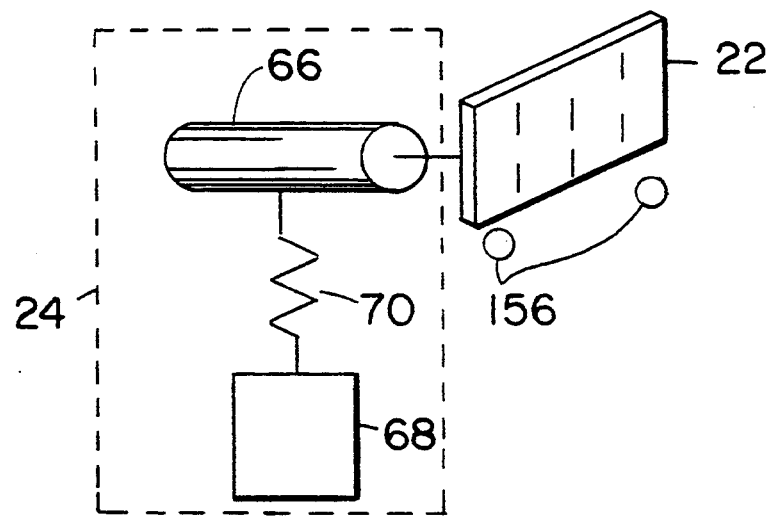
FIG. 4 is a detailed view of the components of the head assembly of FIG. 1.

Referring to FIGS. 1 and 4, magnetic head 22 is mounted on head assembly 24, shown in dashed lines in FIG. 4, for lateral and stepped rotatable movement relative to the tape 12. As shown, the magnetic head 22 is mounted for movement about the output shaft of a rotary motor 66. The rotary motor 66, which receives input from the controller 26, serves to rotatably step the magnetic head 22 relative to the tape 12. A stepper motor 68, which also receives input from controller 26, serves to engage an actuator 70, shown as a linear actuator in FIG. 4, for moving the magnetic head 22 in a lateral or widthwise direction across the tape 12. The stepper motor 68 and the linear actuator 70 are used to adjust the track to track position of magnetic head 22. The rotary motor 66 is used for coarse and fine adjustment of the angle of the magnetic head 22 relative to the azimuth angle of a given track.

Figure 5:
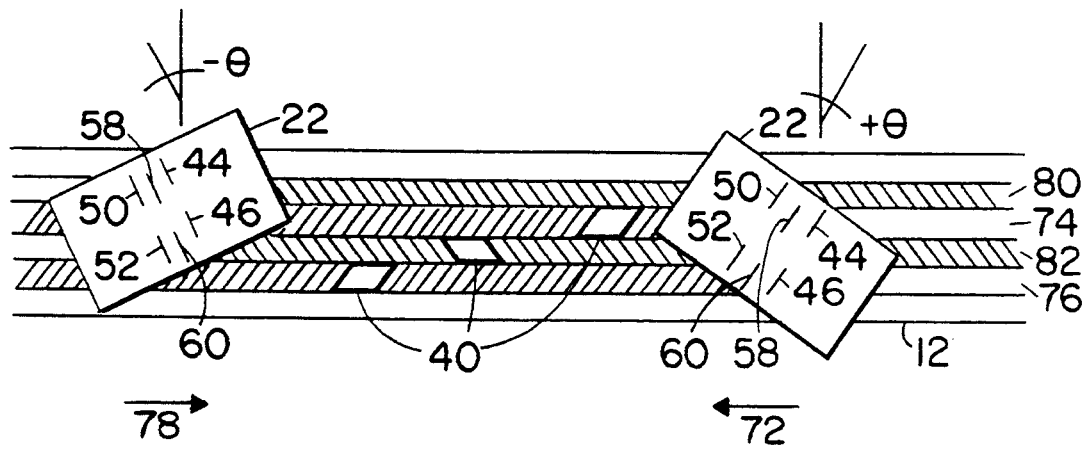
FIG. 5 is a schematic representation of the positioning of the magnetic head of FIG. 2 for writing an azimuth track pattern.

Referring to FIG. 5, during operation, the magnetic tape system 10 moves the tape 12 in a direction indicated by the arrow 72 over the magnetic head 22. As shown on the right side of FIG. 5, the magnetic head 22 is rotated to a positive position relative to tape 12, denoted $+\Theta$, bringing the read and write head gap pairs 58 and 44, and 60 and 46, into general alignment with the tracks 74 and 76. The write head gaps 44 and 46 write tracks 74 and 76 on the tape 12. These tracks extend generally parallel to the edge of the tape 12. In this way, tracks are recorded in which the magnetization direction of the data is at a positive azimuth angle on the tape 12. Also, due to the azimuth position $+\Theta$ of the magnetic head 22, the read head gaps 58 and 60 are able to read check all data written by write head gaps 44 and 46 respectively.

Now referring to FIGS. 4 and 5, when the end of the tape is reached, the direction of travel of the tape 12 is reversed to advance in the direction indicated by the arrow 78. The stepper motor 68 activates the linear actuator 70 which moves the magnetic head 22 laterally over the tape 12 to the next track position to be written. The motor 66 rotatably steps the magnetic head 22 to a negative position, denoted $-\Theta$ as shown on the left side of FIG. 5. This brings the read and write head gap pairs 58 and 50, and 60 and 52, into general alignment with the tracks 80 and 82. In this position the write head gaps 50 and 52 write the tracks 80 and 82 respectively, which extend parallel to the edge of the tape 12. These tracks are written at a negative azimuth angle. And again, due to the azimuth position $-\Theta$ of the magnetic head 22, the read head gaps 58 and 60 are able to read check all data written by write head gaps 50 and 52 respectively.

Figure 6:
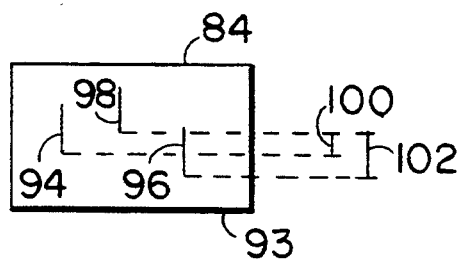
FIG. 6 is a schematic view of the head gap arrangement of another embodiment of a magnetic head according to the principles of the invention.
Figure 7:
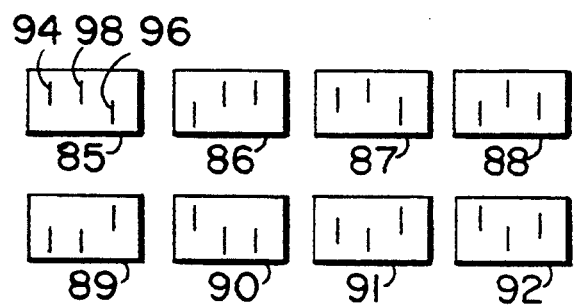
FIG. 7 is a schematic representation of a number of head gap arrangements for different embodiments of magnetic heads according to the principles of the invention.

FIGS. 6 and 7 show some other simple magnetic heads embodying the principles of the invention. In FIG. 6, the magnetic head is denoted by reference number 84; in FIG. 7, the magnetic heads are denoted by reference numerals 85–92. As shown, each of the magnetic heads contains on its surface 93 head gaps 94, 96, and 98. The head gap 98 is offset by a distance and direction 100 from the head gap 94, and offset by a distance and direction 102 from the head gap 96. The head gaps 94 and 96 are laterally spaced from each other. Further, the head gaps 94 and 96 are arranged such that their lengths extend parallel to each other. The head gap 98 is located between the head gaps 94 and 96, and is also arranged such that its length extends parallel to the head gaps 94 and 96. For all the magnetic heads shown in FIGS. 6 and 7, the head gap 98 is placed such that it is offset lengthwise from at least one of the head gaps 94 and 96. In FIG. 6, the head gap 98 is offset in a lengthwise advance direction by a distance 100 from the head gap 94, and is also offset in the same lengthwise advance direction by a distance 102 from the head gap 84. Also, in FIGS. 6 and 7, either the head gaps 94 and 96 are write head gaps and the head gap 98 is a read head gap, or the head gaps 94 and 96 are read head gaps and the head gap 98 is a write head gap.

Any of the magnetic heads of the invention may be used to produce the same recording result. For example, if in FIG. 6 the head gaps 94 and 96 are read head gaps and head gap 98 is a write head gap, and the directions 72 and 78 of tape travel are respectively reversed, the same recording pattern will result, as for example is shown in FIG. 5. Also, if the magnetic head is configured as in examples of magnetic heads denoted by reference numerals 85, 86, 89, or 90 in FIG. 7, in which the head gap 98 is offset from the head gap 96 but laterally aligned with the head gap 94, alternate tracks will be recorded such that the direction of magnetization of the data is perpendicular to the edge of the tape, although it is still effectively different from the direction of magnetization of adjacent tracks. It is thus apparent that the advantages of azimuth recording are obtained where some tracks are recorded at an angle, and adjacent tracks are recorded in the standard lateral format. It is also apparent that the magnetic heads of FIGS. 2, 6, and 7 are capable of reading tapes recorded in a standard format, as the rotary motor 66 is capable of positioning the read head gaps such that they are aligned with track data.

Referring back to FIG. 2, in a preferred embodiment for operation with a standard 0.5 inch magnetic tape, laterally spaced part longitudinal write head gaps of columns 42 and 48 have a length of 1.5 millinches ±0.2 millinches. The longitudinal read head gaps of the third column 56 have a length of 2 millinches ± 0.2 millinches, and are located approximately equidistant from the respective head gaps of columns 42 and 48. The offset 64 is approximately 15 millinches.

Referring to FIG. 4, the stepper motor 68 is capable of 1200 steps/sec at 1.8 degrees/step ±5%. The linear actuator 70 is a lead screw type, advancing 100 microinches per half step. The rotary motor 66 may be implemented either as a gear type DC motor, or a torque or rotary motor. Because the tape 12 is stopped when the tape system 10 is not in operation, no sample data is available. It is impractical to recalibrate after every stop; therefore, the gear motor is presently the best suited, as the motor is required to hold a preset angular value for a time without a large amount of drift.

During operation, as shown in FIG. 5, it has been found advantageous to utilize the above components for azimuth recording with a positive azimuth angle of approximately 2.9 degrees, and a negative azimuth angle of approximately 2.9 degrees, though other azimuth angles may also be implemented as needed.

Figure 8:
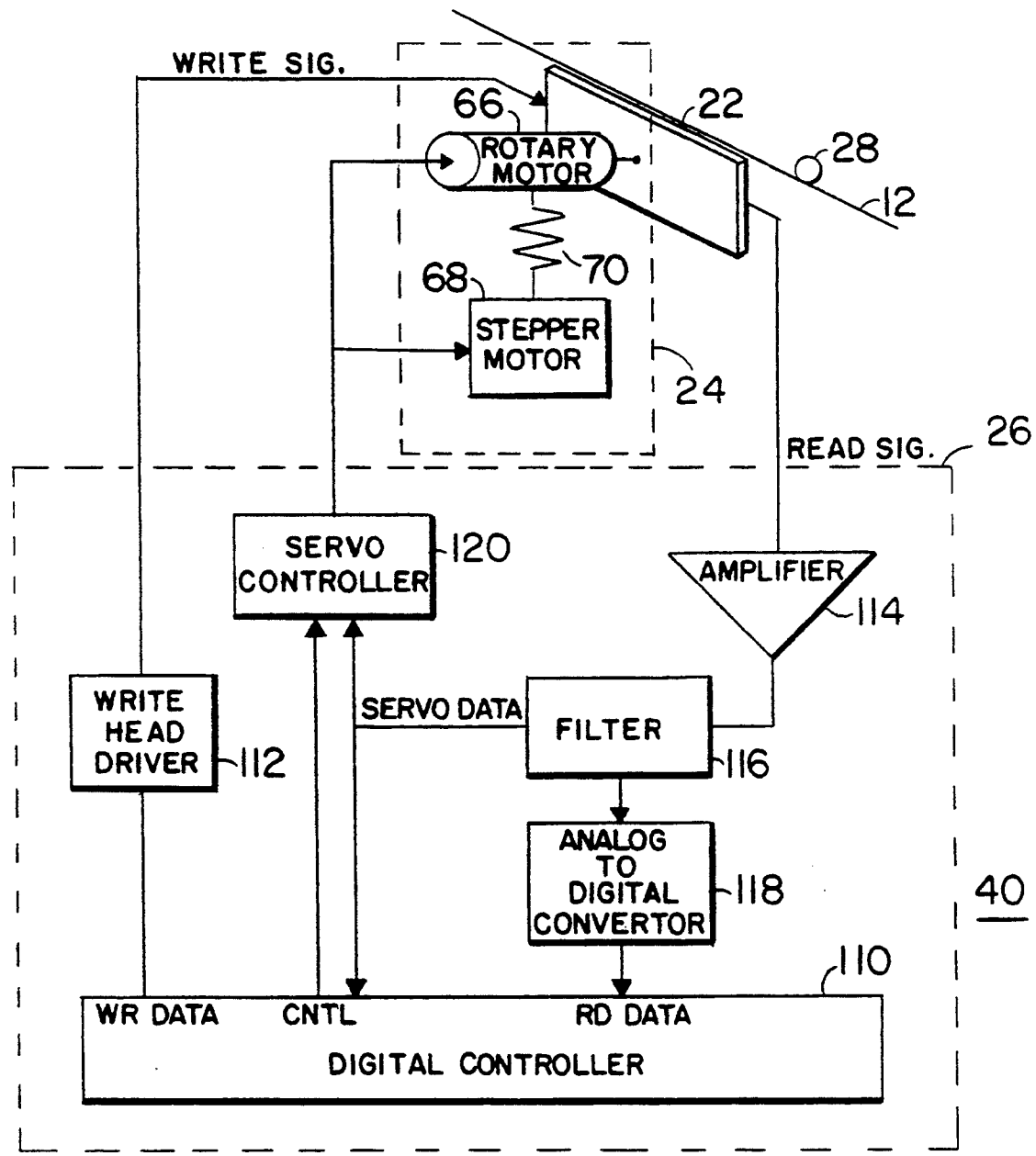
FIG. 8 is a detailed block diagram of the servo for the tape system of FIG. 1.

Referring to FIG. 8, a servo according to the principles of the invention is shown for the tape system 10 of FIG. 1. Controller 26 further includes digital controller 110, digital to analog convertor 112, amplifier 114, filter 116, analog to digital convertor 118, and servo controller 120.

The digital controller 110, implemented by means such as a microprocessor, directs the reading and writing of data on the tape 12. To write data, the digital controller 110 outputs digital data to a head write driver 112, which in turn outputs a write signal to the magnetic head 22. The read signal received by the magnetic head 22 from the tape 12 is amplified by an amplifier 114. The amplified output of the amplifier 114 is in turn input to a filter 116 for separation of low frequency servo information from high frequency read data. Filter 116 may be an accurate bandpass filter, or alternatively, data may be blocked out of track areas adjacent to servo blocks. The high frequency read data output of the filter 116 is coupled to an analog-to-digital convertor 118, the digital output of which is coupled to a read data input of the digital controller 110. Digital controller 110 processes the data and forwards it to a requesting host, such as a mainframe computer system or server. The low frequency servo data output of the filter 116 is input both to digital controller 110 and servo controller 120. Control information, representing such factors as write/read condition and tape direction, is also input to the servo controller 120 from the digital controller 110. Servo controller 120 interprets the servo data and the control information inputs, and generates output control signals which are coupled to the rotary motor 66 and the stepper motor 68 of the head assembly 24 for movement of the magnetic head 22 relative to the tape 12.

Magnetic tape systems such as tape system 10 are subject to the effects of lateral tape motion (LTM), which is the random and unavoidable tendency for the tape to drift or move in a direction lateral to the direction of linear motion of the tape. Left uncorrected, LTM results in recorded tracks which are not perfectly parallel to the edge of the tape. As a result, either guard bands must be placed between tracks, or tracks must be exceptionally wide to guarantee that a track will not be written over, or on, due to LTM. Also, LTM affects the positioning of the read head gap, making it difficult to align the read head gap with the track being read. These uncorrected effects limit track densities by requiring a minimum track width greater than twice the magnitude of the maximum expected LTM.

The servo of the invention effectively negates the effects of LTM, thus rendering potential track densities independent of LTM.

Referring now to FIGS. 3 and 8, as the magnetic head 22 writes data along a track, it periodically writes an interval of servo information 122, 124, 126, or 128 amidst the data. This interval, or servo block, contains servo information of a substantially lower frequency than the track data. These servo blocks are placed at positions along the tape 12 as indicated by the position sensing tachometer 28. During reading, the tachometer 28 monitors the tape 12 and indicates the servo block positions on the tape 12. These servo blocks are then read by the magnetic head 22, amplified by the amplifier 114, and separated by the filter 116 for input to the servo controller 120. The servo controller 120 uses the servo information to drive the stepper motor 68 and the rotary motor 66 of the head assembly 24 in order to control the position of the magnetic head 22 for writing and reading tracks.

Figure 9:
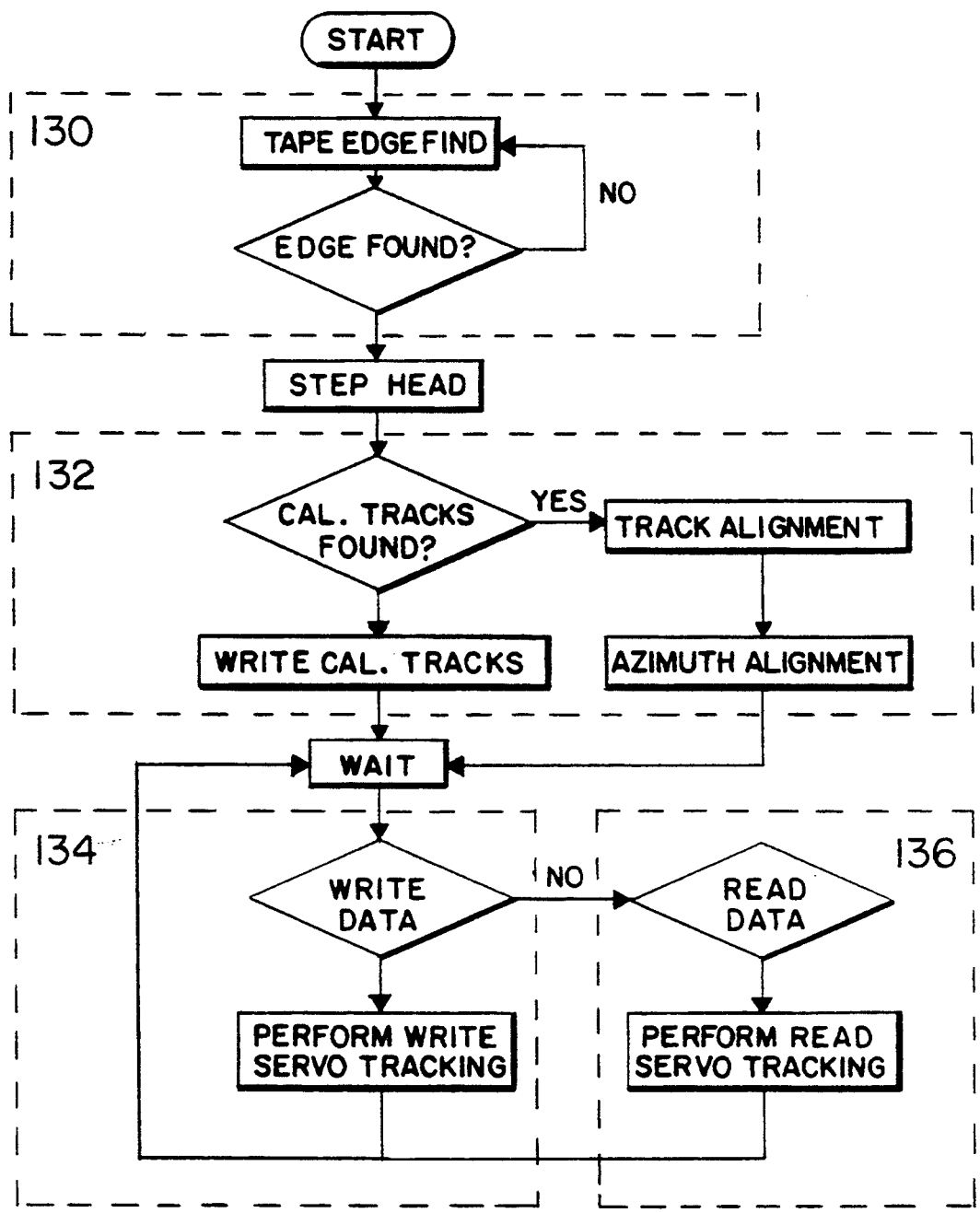
FIG. 9 is a general flow chart of the operation of the servo according to the principles of the invention.

As shown in the flowchart of FIG. 9, the servo method consists of calibration, write, and read operations, each of which is further described in detail.

Referring to block 130 of FIG. 9, calibration begins with a tape edge find operation. The magnetic head 22 is initially positioned off the edge of the tape 12. It is stepped toward the tape until it can successfully reproduce, beyond a predetermined noise threshold, data it attempts to write.

After the edge of the tape 12 has been found, the tape 12 must be calibrated, as shown in block 132 of FIG. 9. The servo controller 120 directs the magnetic head 22 to look for calibration tracks which will exist if the tape has been written. The magnetic head 22 is stepped a pre-determined distance from the edge of the tape. If the tape is blank, calibration tracks will not be found, therefore, calibration tracks will be written in the calibration area at the beginning of the tape. These calibration tracks are used for lateral alignment with track 0 (the first track written on the tape) and for azimuth alignment which may be necessary between tapes and heads of different systems.

Figure 10:
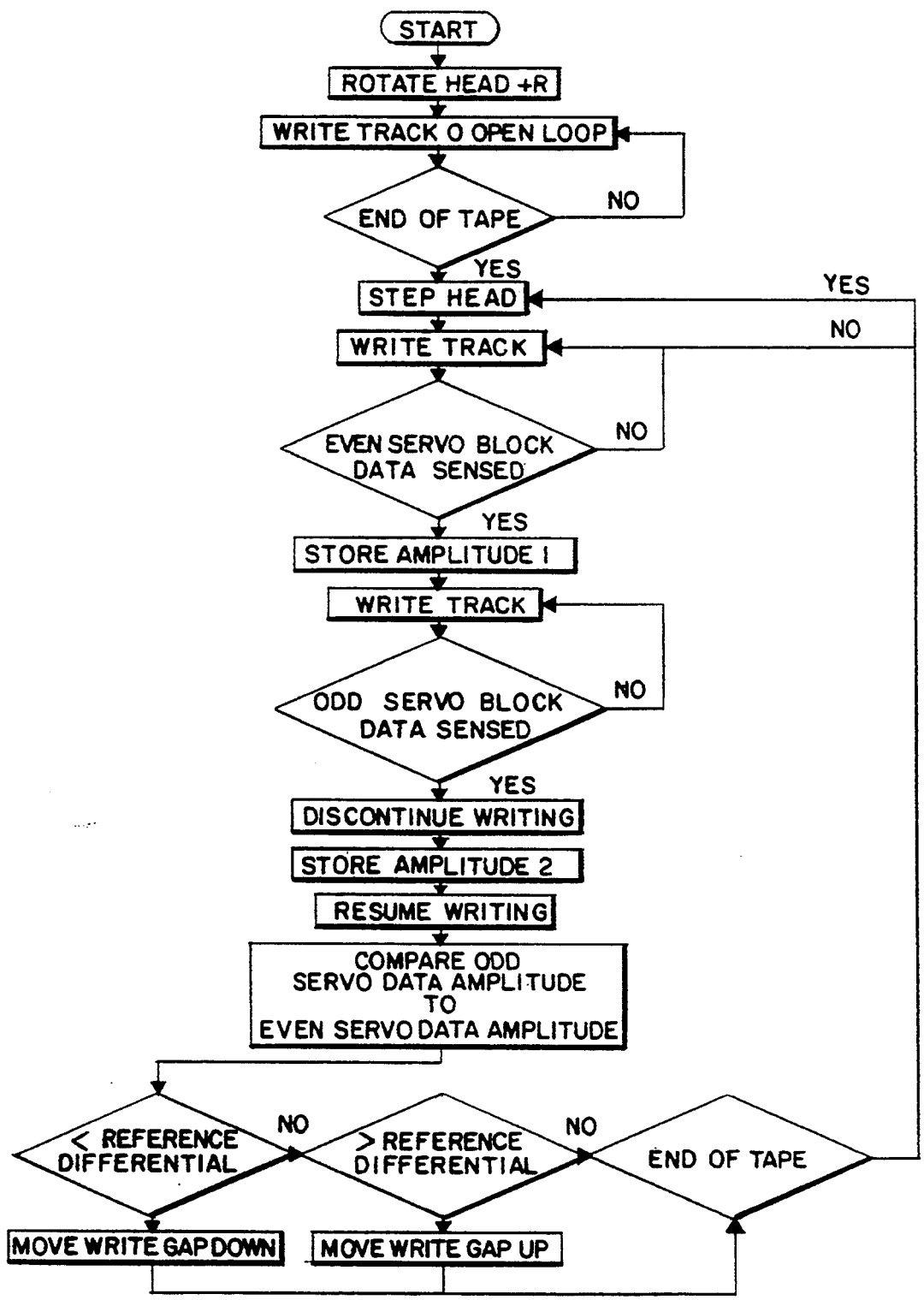
FIG. 10 is a detailed flow chart of the write servo block of FIG. 9, showing the operation of the write servo according to the principles of the invention.
Figure 11:
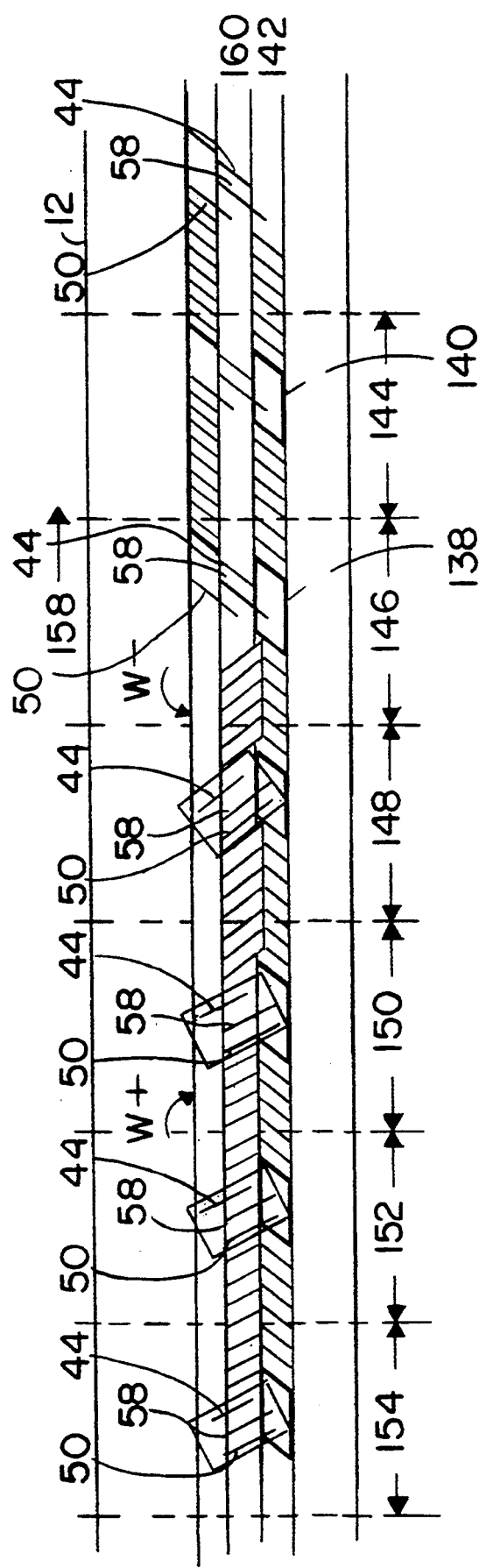
FIG. 11 is a schematic representation of the successive angular positioning of the magnetic head of FIG. 2 during operation of the write servo.

After the tape system 10 has been calibrated, the tape 12 may be written. The write servo of the invention results in significant track density increases. FIG. 10, a detailed representation of block 134 of FIG. 9, presents a flow diagram of the operation of the write servo. FIG. 11 is an expanded view of the positioning of read head gap 58 and write head gaps 44 and 50 of magnetic head 22 relative to the servo blocks 138 and 140 along a track 142. Markers 144, 146, 148, 150, 152, and 154 indicate different positions along the tape 12.

Referring to FIGS. 10 and 11, after the track 0 location is determined through the calibration method previously described, a first data track 142 is written open loop, under no servo control, at this lateral position. As described previously with reference to FIG. 5, magnetic head 22 is rotated to a positive azimuth angle $+\Theta$ against hard stop 156 (shown in FIG. 4), and the tape is driven past the magnetic head in the forward direction 72. Track 142 is written to contain intervals of data at the data frequency, followed by intervals of servo tracking information 138 and 140 at a second lower frequency. The servo intervals, or blocks, are inserted amidst the track 142 data at pre-determined intervals as indicated by tachometer 28. In FIG. 11, a section of track 142 is shown. Track 142 data is written such that it is interspersed with alternate odd servo blocks 138 and even servo blocks 140.

The servo block frequency and intervals are calculated based on the frequency of the data and the speed of advancement of the tape. The servo block frequency must be high enough to store the tracking information in a reasonably small tape space, however, it must be sufficiently low compared to the data frequency such that tracking information from an adjacent track is not attenuated due to azimuth mis-alignment past the point where it can be distinguished by the magnetic head. A typical functional data to servo frequency ratio is approximately (10–20):1. For example, a functional system may use a 4 megahertz data frequency, and a 20 Khz servo frequency. The servo blocks must be placed on the tape at intervals depending on the speed of linear advancement of the tape and the maximum expected frequency of the lateral tape motion, such that the sampling rate provided by the servo blocks is at least twice the lateral tape motion frequency; therefore, the servo block separation is at most V/2F, where V is tape speed and F is maximum lateral tape motion frequency. In a typical system, if the lateral tape motion frequency is on the order of 2 hz and the tape speed is 100 in/s, the sampling frequency provided by the servo blocks must be at least 4 hz, making the maximum separation of the servo blocks 25 inches.

Referring to FIG. 11, When the track 142 writing is complete and the end of the tape is reached, the magnetic head 22 is stepped upward the desired center track pitch. The read head gap 58 is slightly longer than the write head gaps 44 and 50; therefore, the read head gap 58 partially overlaps the upper edge of the track 142 in this position. The write head gap 44 is positioned well above the track 142. The tape 12 is now advanced in the reverse direction as depicted by the arrow 158.

Write servo is now invoked during the data write for the track 160, and will be described according to the series of steps in the flow chart of FIG. 10, while referring also to FIGS. 8 and 11.

As data is written in track 160, the tachometer 28 (shown in FIG. 1) monitors the tape 12 for the presence of odd servo blocks 138 and even servo blocks 140 by providing accurate positional information as to where the servo blocks 138 and 140 were written. The track 160 write proceeds normally over the even servo block 140 at position 144 in FIG. 11, and the read head gap 58 reproduces the even servo block data 140 from track 142. When the odd servo block 138 at position 146 is indicated by the tachometer, writing is interrupted while read head gap 58 again reproduces the servo data. Because low frequencies are not greatly subject to attenuation due to azimuth misalignment, reproduction of low frequency servo data is possible in spite of the azimuth misalignment of the read head gap 58 to the servo data. The difference in amplitude Z between the reproduction of the reference even servo block 140 at position 144 and the reproduction of the odd servo block at position 146 is calculated by means such as a differential amplifier in the servo controller 120.

This difference in amplitude $\Sigma$ is compared to a reference differential K by means such as a voltage comparator in servo controller 120. Reference differential K indicates a predetermined lateral relationship between tracks, thereby representing the desireable range for which write head gap 50 may deviate from the edge of track 142. When Z is less than the lower limit of the permitted range K, the even and odd servo block 140 and 138 amplitudes are approximately equal, indicating that the write head gap 50 is not sufficiently close to track 142, and thus is positioned somewhere above track 142. When $\Sigma$ is greater than the upper limit of the range K, the write head gap 50 has written over the odd servo block 138, decreasing its read amplitude relative to the reference even servo block 72. Such a comparison indicates that write head gap 50 is positioned too far towards track 142. When $\Sigma$ is within the range K, the write head gap 50 is positioned toward odd servo block 138 far enough to indicate that track 160 is being written at the predetermined lateral relationship to track 142. In FIG. 5, and at position 154 of FIG. 11, this relationship is shown to be contiguous.

Referring back to the example of FIG. 11 at position 146, because $\Sigma$ is less than the lower limit of the permitted range K, servo controller 120 directs the head assembly 24 to rotate the magnetic head 22 in the negative direction as depicted in FIG. 11 by arc $\omega-$, bring write head gap 50 toward track 142. As the magnetic head 22 passes over the even servo block 140 at position 148, both the read gap 58 and the write gap 50 overlap track 142. Data is written as usual. When magnetic head 22 reaches the odd servo block 138 at position 150, read head gap 58 reproduces the servo data and the servo controller 120 again stores the difference $\Sigma$ between the amplitude of this odd servo block 138 and the previous reference even servo block 140. In this case the difference in amplitude $\Sigma$ is evaluated to be greater than the permitted range K, indicating that the magnetic head 22 is positioned such that write head gap 50 is positioned too far toward track 142. As a result, the servo controller 120 directs rotation of the magnetic head 22 in the opposite direction represented by the arc $\omega+$, moving write head gap farther from track 142, and writing occurs as usual. When the next even servo block 140 is reached at position 152, the center of the write head gap 50 of the magnetic head 22 is positioned between its previous two lateral positions. When the odd servo block 138 at position 154 passes under the magnetic head 22, the difference in amplitude $\Sigma$ of this odd servo block 138 and the previous reference even servo block 140 as read by the read head gap 58 is evaluated by the servo controller 120 and determined to be within the desireable range K. The write head gap 50 is now ideally positioned such that it slightly overlaps track 142, such that track 142 and track 160 are in a contiguous relationship.

This write servo will continually correct the position of the write head gap relative to the edge of track 142 in spite of any perturbations in the direction of track 142 due to lateral tape motion which may have occurred when track 142 was written. Any lateral tape motion which occurs during the writing of track 160 will also invoke the same write servo for correction.

When the end of the tape is reached again, the head is rotated to a positive azimuth angle, and the process is repeated. This process continues until the entire tape is written. With this servo, the first track written is the only track which is subject to random variation in lateral direction due to lateral tape motion. All other tracks are written under servo control so as to be contiguous to the previous track written. This servo mechanism eliminates the need for guard bands between tracks or unnecessarily wide tracks to compensate for lateral tape motion. Because lateral tape motion affects writing only during the recording of track 0, its effects may now be ignored when determining minimum possible track width. Therefore, this write servo method allows much greater track densities than previously possible. In addition, head gap alignment tolerances may be relaxed, because the write servo automatically rotatably aligns the write and read head gaps such that the read head gaps are aligned with the track being written.

A number of variations on this write servo are possible. Though the previous description referred to the rotary motor 66 as the means for adjusting the lateral position of the write head gap, it may also be reasonable to employ the stepping motor 68 and linear actuator 70 for this purpose; particularly at the beginning of a track write, where more substantial lateral corrections may be needed. Also, though the means for monitoring the tape 12 for servo blocks is presented herein as a tachometer, the reproduction of servo data itself may be sufficient as an indication that servo is present. In addition, the longer read head gaps 58 and 60 are not necessary to the invention. Where write gaps of larger dimension are used, the servo reference differential K can be adjusted to allow more substantial over-writing of tracks. Also, it is conceivable to perform the comparison based on amplitudes received from a single servo block. For instance, when the tachometer indicates that a servo block is present, its amplitude may be read twice: once with the write head gap disabled, and once with the write head gap enabled. The comparison is then performed based on the two amplitudes received.

Figure 12:
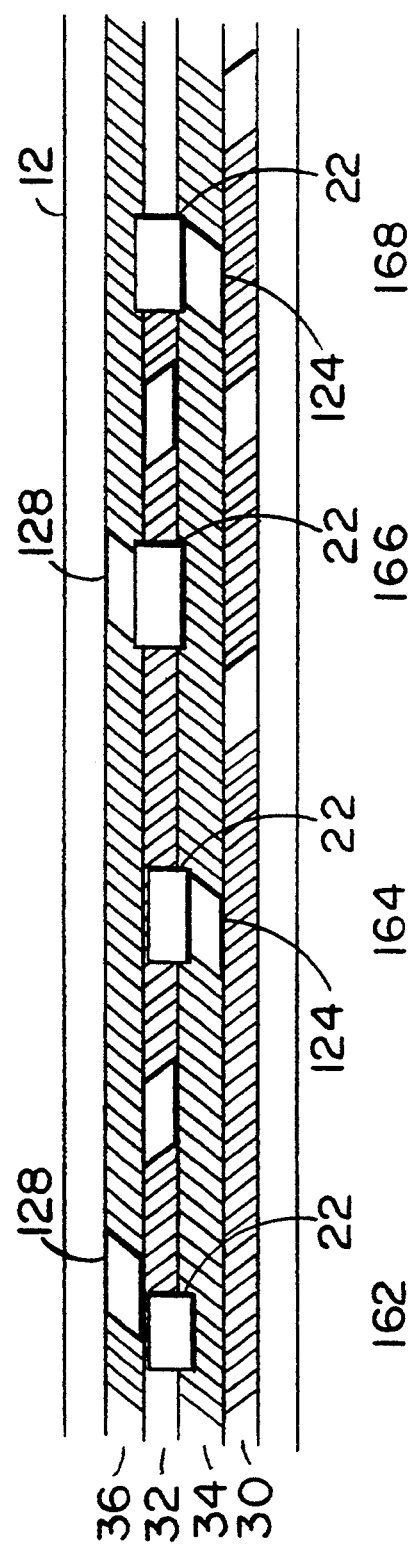
FIG. 12 is a schematic representation of the lateral positioning of the magnetic head of FIG. 2 during operation of the read servo in accordance with the principles of the invention.

The servo of the invention also corrects the lateral positioning of the magnetic head 22 during reading. The read servo, block 136 of the flow chart of FIG. 9, and further detailed in the flow chart of FIG. 13, requires that the servo blocks be aligned in a staggered fashion relative to each other as shown for example in FIG. 3. FIG. 3 is a schematic representation of a portion of tape which displays the azimuth recording pattern and the positioning of the servo blocks. Tracks 30 and 32 are recorded in the forward direction, while tracks 34 and 36 are recorded in the reverse direction. Tracks 30, 32, 34, and 36 contain alternate data and servo information. Servo blocks are labeled 122, 124, 126, and 128 relative to their positions on the tape. FIG. 12 is an expanded view of tracks 36, 32, and 34 of FIG. 3. The positioning of magnetic head 22 is shown for successive tape positions 162, 164, 166, and 168.

Figure 13:
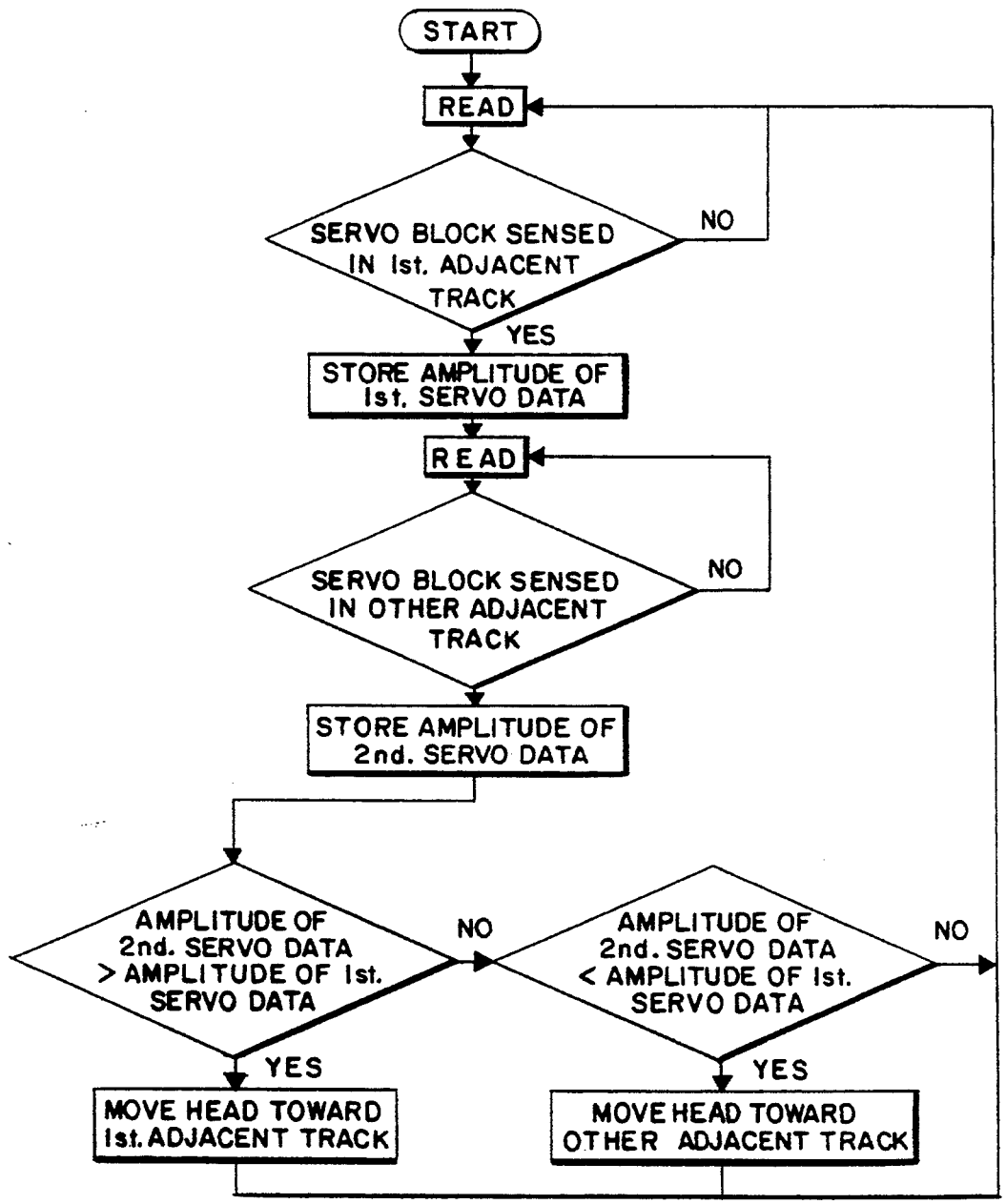
FIG. 13 is a detailed flow chart of the read servo block of FIG. 9, showing the operation of the read servo according to the principles of the invention.

The operation of the read servo will be described by example while referring to FIGS. 8, 12, and 13. On the left side of FIG. 12, the magnetic head 22 is positioned to read track 32, but is misaligned toward track 34. As the tape advances in a forward direction across the magnetic head 22 past position 162, the read head gap 58 will reproduce a small signal from servo block 128 of track 36 at position 162. A value representing the signal strength of the received servo signal will be stored in servo controller 120. According to the principles of the invention, azimuth misalignment of the read head gap 58 to the high frequency data of tracks 36 and 34 prevent excessive crosstalk noise during reading; however, the low frequency servo signal from either adjacent track will be received in spite of the azimuth misalignment. As the tape continues to advance, magnetic head 22 will cross a servo block 124 of track 34 at position 164. The signal reproduced from this servo block will be of a higher amplitude than the signal previously received from servo block 128 of track 36, and will also be stored in servo controller 120. The servo controller 120, using means such as a voltage comparator, will compare the signal strengths of the servo signals received from servo blocks 124 and 128 to adjust the lateral position of the head over track 32. If the signal strength received from a servo block 124 is greater than the signal strength received from a servo block 128, the servo controller 120 will drive stepper motor 68 to move magnetic head 22 towards the adjacent track 36 containing servo blocks 128. Likewise, if the signal strength received from a servo block 128 is greater than the signal strength received from a servo block 124, the servo controller 120 will drive stepper motor 68 to move magnetic head 22 towards the other adjacent track 34 containing servo blocks 124. Magnetic head 22 is centered over track 32 when successive servo block reads result in equal signal amplitudes, as shown at positions 166 and 168.

Alternatively, referring to FIG. 3, the particular servo block pattern shown is not necessary to the operation of the read servo. Any pattern that allows servo to be read from adjacent tracks only may be functional. For instance, if the servo blocks 126 and 128 of FIG. 3 are laterally aligned with the servo blocks 122 and 124 respectively, the read servo would be functional, though subject to providing ambiguous results when the magnetic head 22 is misaligned exactly between two tracks.

In addition to lateral adjustment of read head gap 58, the read servo also adjusts the azimuth position of read head gap 58 relative to the azimuth angle of the track data. To adjust the azimuth position of read gap 58, magnetic head 22 is rotated by rotary motor 66 (shown in FIG. 4) in both the positive and negative directions while data is being read. The angular position in which maximum data amplitude is obtained indicates the optimal azimuth position of read head gap 58.

The servo previously presented has been described in terms of an azimuth recording system. The azimuth track pattern is not required for implementation of this servo. The same servo can be utilized in a tape system with standard track patterns in which the direction of magnetization of data is the same. However, there must be provided some means for distinguishing low frequency servo blocks over high frequency data, such as a separate servo head gap.

It is apparent that, within the scope of the invention, modifications and different arrangements may be made other than as herein disclosed. The present disclosure is merely illustrative, the invention comprehending all variations thereof.

I claim:

1. A method of linear recording on a magnetic medium comprising:
    writing information in a first track lengthwise on the magnetic medium, the first track being written to include alternate data and servo information;
    writing information in a second track upon completion of the first track, the second track being written in adjacent lateral relationship to the first track;
    monitoring the first track during writing of the second track for the presence of servo information;
    interrupting the writing of information in the second track when a servo block is sensed in the first track;
    reading the amplitude of servo information;
    resuming writing information in the second track;
    reading the amplitude of additional servo information in the first track;
    supplying a reference differential indicating a predetermined lateral relationship between tracks;
    comparing the difference between the two amplitude readings of servo information with the reference differential;
    adjusting the lateral position of writing in the second track in response to the comparison when said comparison falls outside the reference differential to bring the two tracks into the predetermined lateral relationship.

2. The method of claim 1 wherein said writing of information in a first track further comprises writing said information at an azimuth angle.

3. The method of claim 1 wherein said writing of information in a second track further comprises writing said information at a different azimuth angle.

4. The method of claim 1 wherein said medium is tape.

5. The method of claim 1 wherein reading the amplitude of servo information further comprises reading a first amplitude of servo information from a first servo block.

6. The method of claim 1 wherein reading the amplitude of additional servo information in the first track further comprises reading the amplitude of servo information from a second servo block.

7. The method of claim 1 wherein said predetermined lateral relationship is substantially contiguous.

8. The method of claim 1 wherein the step of adjusting further comprises:
moving the lateral position of writing of the second track further from said first track when said difference is greater than said differential;
moving the lateral position of writing of the second track toward said first track when said difference is less than said differential.

9. A method of linear recording on a magnetic medium comprising:
writing information in a first track lengthwise on the magnetic medium, the first track being written to include data and alternate even and odd servo blocks;
writing information in a second track upon completion of the first track, the second track being written in adjacent lateral relationship to the first track;
monitoring the first track during writing of the second track for the presence of an odd servo block;
interrupting the writing of information in the second track when an odd servo block is sensed in the first track;
reading the amplitude of the odd servo block;
resuming writing information in the second track;
monitoring the first track during writing of the second track for the presence of an even servo block;
reading the amplitude of the even servo block;
supplying a reference differential indicating a predetermined lateral relationship between tracks;
comparing the difference between the even and odd servo block amplitude readings with the reference differential;
adjusting the lateral position of writing in the second track in response to the comparison when said comparison falls outside the reference differential to bring the two tracks into the predetermined lateral relationship.

10. The method of claim 9 wherein said writing of information in a first track further comprises writing said information at an azimuth angle.

11. The method of claim 9 wherein said writing of information in a second track further comprises writing said information at a different azimuth angle.

12. The method of claim 9 wherein said medium is tape.

13. The method of claim 9 wherein said predetermined lateral relationship is substantially contiguous.

14. The method of claim 9 wherein the step of adjusting further comprises:
moving the lateral position of writing of the second track further from said first track when said difference is greater than said differential;
moving the lateral position of writing of the second track toward said first track when said difference is less than said differential.

15. Apparatus for linear recording on a magnetic medium comprising:
means for writing information in a first track lengthwise on a magnetic medium, the first track being written to include alternate data and servo information;
means for writing information in a second track upon completion of the first track, the second track being written in adjacent lateral relationship to the first track;
means for monitoring the first track during writing of the second track for the presence of servo information;
means for interrupting the writing of information in the second track when a servo block is sensed in the first track;
means for reading the amplitude of servo information;
means for resuming writing information in the second track;
means for reading the amplitude of additional servo information in the first track;
means for supplying a reference differential indicating a predetermined lateral relationship between tracks;
means for comparing the difference between the two amplitude readings of servo information with the reference differential;
means for adjusting the lateral position of writing in the second track in response to the comparison when said comparison falls outside the reference differential to bring the two tracks into the predetermined lateral relationship.

16. The apparatus of claim 15 wherein said means for writing of information in a first track further comprises means for writing said information at an azimuth angle.

17. The apparatus of claim 15 wherein said means for writing of information in a second track further comprises means for writing said information at an azimuth angle.

18. The apparatus of claim 15 wherein said medium is tape.

19. The apparatus of claim 15 wherein said means for reading the amplitude of servo information further comprises means for reading a first amplitude of servo information from a first servo block.

20. The apparatus of claim 15 wherein said means for reading the amplitude of additional servo information in the first track further comprises means for reading the amplitude of servo information from a second servo block.

21. The apparatus of claim 15 wherein said predetermined lateral relationship is substantially contiguous.

22. The apparatus of claim 15 wherein the means for adjusting further comprises:
means for moving the lateral position of writing of the second track further from said first track when said difference is greater than said differential;
means for moving the lateral position of writing of the second track toward said first track when said difference is less than said differential.

23. Apparatus for linear recording on a magnetic medium comprising:
means for writing information in a first track lengthwise on a magnetic medium, the first track being written to include data and alternate even and odd servo blocks;
means for writing information in a second track upon completion of the first track, the second track being written in adjacent lateral relationship to the first track;
means for monitoring the first track during writing of the second track for the presence of an odd servo block;

means for interrupting the writing of information in the second track when an odd servo block is sensed in the first track;

means for reading the amplitude of the odd servo block;

means for resuming writing information in the second track;

means for monitoring the first track during writing of the second track for the presence of an even servo block;

means for reading the amplitude of the even servo block;

means for supplying a reference differential indicating a predetermined lateral relationship between tracks;

means for comparing the difference between the even and odd servo block amplitude readings with the reference differential;

adjusting the lateral position of writing in the second track in response to the comparison when said comparison falls outside the reference differential to bring the two tracks into the predetermined lateral relationship.

24. The apparatus of claim 23 wherein said means for writing of information in a first track further comprises means for writing said information at an azimuth angle.

25. The apparatus of claim 23 wherein said means for writing of information in a second track further comprises means for writing said information at an azimuth angle.

26. The apparatus of claim 23 wherein said medium is tape.

27. The apparatus of claim 23 wherein said predetermined lateral relationship is substantially contiguous.

28. The apparatus of claim 23 wherein the step of adjusting further comprises:

means for moving the lateral position of writing of the second track further from said first track when said difference is greater than said differential;

means for moving the lateral position of writing of the second track toward said first track when said difference is less than said differential.

29. A method of linear recording on a magnetic tape comprising:

writing information in a first track lengthwise on the magnetic tape, the first track being written at an azimuth angle to include data and alternate even and odd servo blocks;

writing information in a second track upon completion of the first track, the second track being written at a different azimuth angle and in adjacent lateral relationship to the first track;

monitoring the first track during writing of the second track for the presence of an odd servo block;

interrupting the writing of information in the second track when an odd servo block is sensed in the first track;

reading the amplitude of the odd servo block;

resuming writing information in the second track;

monitoring the first track during writing of the second track for the presence of an even servo block;

reading the amplitude of the even servo block;

supplying a reference differential indicating that the first and second tracks are substantially contiguous;

comparing the difference between the even and odd servo block amplitude readings with the reference differential;

moving the lateral position of writing of the second track further from said first track when said difference is greater than said differential;

moving the lateral position of writing of the second track toward said first track when said difference is less than said differential.

30. Apparatus for linear recording on a magnetic tape comprising:

means for writing information in a first track lengthwise on a magnetic tape, the first track being written at an azimuth angle to include data and alternate even and odd servo blocks;

means for writing information in a second track upon completion of the first track, the second track being written at a different azimuth angle and in adjacent lateral relationship to the first track;

means for monitoring the first track during writing of the second track for the presence of an odd servo block;

means for interrupting the writing of information in the second track when an odd servo block is sensed in the first track;

means for reading the amplitude of the odd servo block;

means for resuming writing information in the second track;

means for monitoring the first track during writing of the second track for the presence of an even servo block;

means for reading the amplitude of the even servo block;

means for supplying a reference differential that the first and second tracks are substantially contiguous;

means for comparing the difference between the even and odd servo block amplitude readings with the reference differential;

means for moving the lateral position of writing of the second track further from said first track when said difference is greater than said differential;

means for moving the lateral position of writing of the second track toward said first track when said difference is less than said differential.

* * * * *